(12) United States Patent
De Lima

(10) Patent No.: US 9,358,831 B2
(45) Date of Patent: Jun. 7, 2016

(54) SAFETY DEVICE FOR A VEHICLE WHEEL

(76) Inventor: Bernard De Lima, Pessac (FR)

( * ) Notice: Subject to any disclaimer, the term of this patent is extended or adjusted under 35 U.S.C. 154(b) by 566 days.

(21) Appl. No.: 13/817,166

(22) PCT Filed: Aug. 16, 2011

(86) PCT No.: PCT/FR2011/051916
§ 371 (c)(1),
(2), (4) Date: Apr. 26, 2013

(87) PCT Pub. No.: WO2012/022911
PCT Pub. Date: Feb. 23, 2012

(65) Prior Publication Data
US 2013/0207447 A1    Aug. 15, 2013

(30) Foreign Application Priority Data
Aug. 18, 2010    (FR) ...................... 10 56649

(51) Int. Cl.
| B60B 7/04 | (2006.01) |
| B60B 7/06 | (2006.01) |
| B60B 3/14 | (2006.01) |
| B60B 3/16 | (2006.01) |
| B60B 7/08 | (2006.01) |
| B60B 7/14 | (2006.01) |
| F16B 37/14 | (2006.01) |
| F16B 39/10 | (2006.01) |
| F16B 31/04 | (2006.01) |

(52) U.S. Cl.
CPC ................. *B60B 7/066* (2013.01); *B60B 3/145* (2013.01); *B60B 3/165* (2013.01); *B60B 7/04* (2013.01); *B60B 7/08* (2013.01); *B60B 7/14* (2013.01); *F16B 37/14* (2013.01); *F16B 39/10* (2013.01); *F16B 39/101* (2013.01); *F16B 31/04* (2013.01)

(58) Field of Classification Search
CPC ........... B60B 3/14; B60B 3/147; B60B 3/16; B60B 3/165; F16B 41/00; F16B 41/002; F16B 41/005
USPC ............. 301/35.624–35.625, 37.101, 37.372, 301/37.376
See application file for complete search history.

(56) References Cited

U.S. PATENT DOCUMENTS

| 2,758,628 | A | * | 8/1956 | Rice | ...................... F16B 39/101 301/35.624 |
| 3,489,196 | A | * | 1/1970 | Stock | ........................ B60B 3/16 301/35.53 |
| 6,419,326 | B1 | * | 7/2002 | Rains | ........................ B60B 7/16 301/37.21 |
| 2006/0261668 | A1 | * | 11/2006 | Hauler | ...................... B60B 7/04 301/108.1 |
| 2009/0167074 | A1 | | 7/2009 | De Lima | |

FOREIGN PATENT DOCUMENTS

| AT | 397 789 | | 6/1994 |
| EP | 0 865 940 | | 9/1998 |
| EP | 1 538 351 | | 6/2005 |
| FR | 2 897 014 | | 8/2007 |
| GB | 2 325 504 | | 11/1998 |
| GB | 2 394 263 | | 4/2004 |
| GB | 2394263 | * | 4/2004 |
| WO | 2005/037571 | | 4/2005 |

OTHER PUBLICATIONS

International Search Report dated Dec. 5, 2011, corresponding to PCT/FR2011/051916.

* cited by examiner

*Primary Examiner* — Jason Bellinger
(74) *Attorney, Agent, or Firm* — Young & Thompson

(57) ABSTRACT

A safety device (10) for a vehicle wheel (12), the device securing the attachment elements (16) of the rim (18) of the wheel onto a hub (14), wherein the device (10) includes elements (20) for blocking the rotation of the attachment elements and elements (21) for supporting the blocking elements on the attachment elements, the rotation-blocking elements including female parts (24) and at least one peripheral wall (26, 26I, 26E) against which the female parts abut when rotating, wherein at least a portion of the attachment elements receives a female part, the supporting elements (21) include an upper wall (36) that covers the attachment elements provided with the female parts, and the upper wall (36) blocks the translation of the female parts along the attachment elements, wherein the device includes elements (22) for rigidly connecting to the wheel, and the rigid connection is mechanically locked.

13 Claims, 7 Drawing Sheets

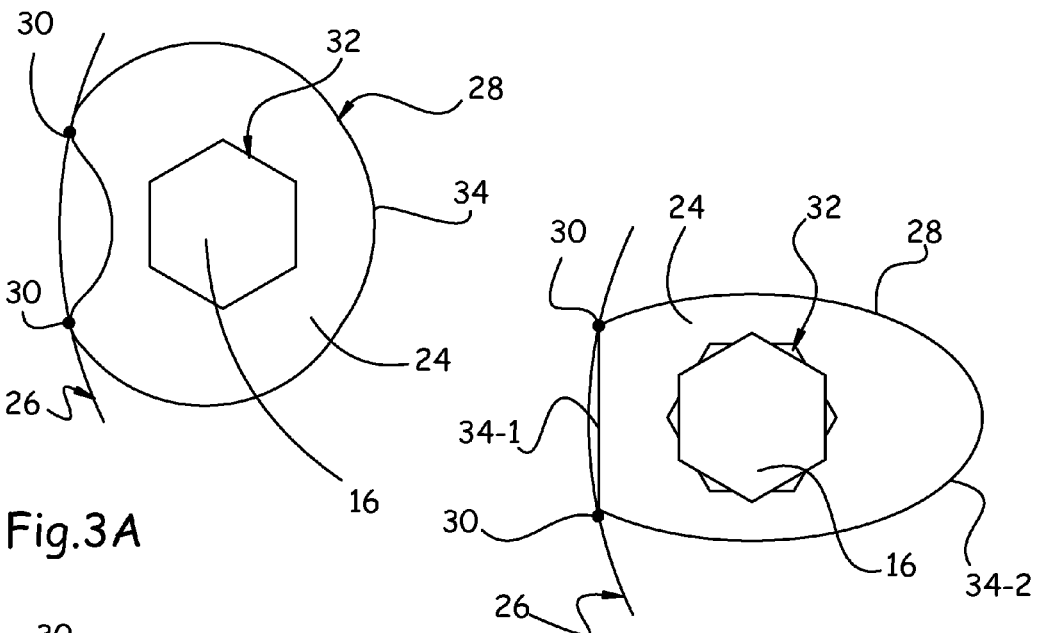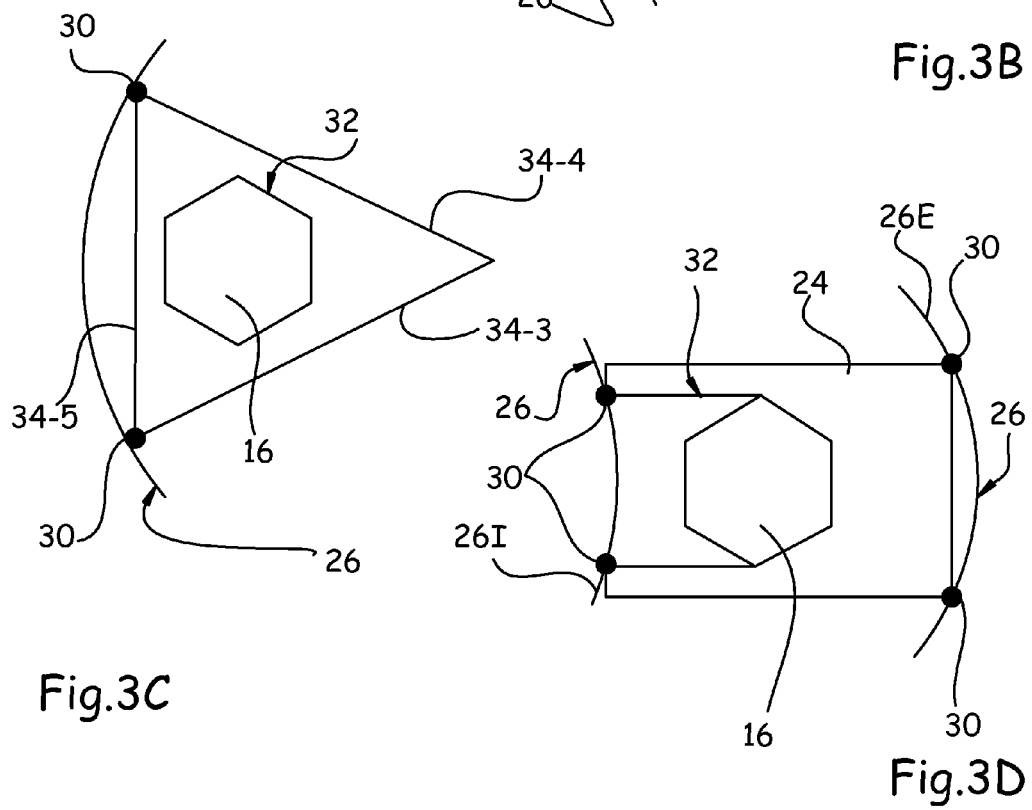

US 9,358,831 B2

SAFETY DEVICE FOR A VEHICLE WHEEL

CROSS REFERENCE TO RELATED APPLICATIONS

The present application is a Continuation of PCT International Application No. PCT/FR2011/051916 filed on Aug. 16, 2011, which claims priority under 35 U.S.C §119(a) to French Patent Application No. 10 56649 filed on Mar. 29, 2012. Each of the above applications is hereby expressly incorporated by reference, in its entirety, into the present application.

This invention relates to a safety device for a wheel for a vehicle, in particular a road transport vehicle, with said device making it possible to prevent the detachment of attachment elements from said wheel at the hub.

BACKGROUND OF THE INVENTION

In the road transport sector, the wheels are mechanical elements that are particularly monitored.

For example, it is important to frequently monitor the wear and tear and the inflation pressure of tires to ensure transport safety.

Also, the screws or the nuts for attaching wheels, and more precisely their tightening torque, should also be monitored regularly.

Actually, because of the vibrations generated by irregularities in the highway pavement and by shocks due to more significant imperfections of said pavement, said attachment elements tend to come loose, which can lead to complete detachment of the wheel relative to the hub.

The detachment of a wheel is dangerous, not only for the driver of the transport vehicle, but also for those drivers of the vehicles located nearby. And, if all of the drivers are safe and sound after the detachment of a wheel, it is the vehicles that are damaged and more particularly the transport vehicle and its load.

Also, it has been noted that in the case of a road transport vehicle, the material consequences of the detachment of a wheel are rarely insignificant.

In contrast, given the number of wheels mounted on the axles of a tractor cab and its trailer, the monitoring of the tightening torque of each of the attachment elements may prove long and tedious for the driver.

In addition, with regard to the many kilometers traveled by the road transport vehicles, the tightening torque of the attachment elements is to be monitored regularly.

However, said monitoring generally is not done as frequently as necessary and, thinking to remedy the problem effectively, some greatly exceed the recommended tightening torque, at the risk of damaging the threads of the attachment elements and even leading to bolt breakage.

Several devices of the prior art have been developed so as to limit or to prevent the detachment of a wheel from a vehicle.

The French patent, of the same applicant and published under the number FR-2897014 and relative to a safety device for a vehicle wheel, thus is known, with said wheel comprising a rim attached to the hub of said vehicle by attachment elements and equipped with a hub cap.

Said device comprises anti-rotational means that assume in particular the shape of caps and that are provided to work with the elements for attachment of the rim on the hub and are integrated with said hub cap.

A first drawback of this first device comes from the necessity of blindly aligning the caps one by one so that they work with the attachment elements during the installation of the hub cap on the wheel, with said hub cap hiding the rim and said attachment elements.

The installation of this first device may prove to be long and complicated when each vehicle wheel is connected to a hub by about ten attachment elements.

In addition, with the integration of the anti-rotational means according to this first device providing a free mounting in rotation of the caps carried by the hub cap, the machining and the adjustments that are necessary to said mounting of the caps considerably increase the manufacturing cost of this first device.

So as to avoid the mounting difficulties and to reduce the manufacturing cost, a second device, presented in the British patent application GB-2325504, provides an arrangement in which the anti-rotational means take the shape of separate elements: with the first elements each working with one of the attachment screws and each comprising a lateral extension, and a second element that can be assimilated with a cover and that comprises at least one outer side wall against which the extensions of said first elements abut to stop the rotation, and therefore the unscrewing, of the attachment screws.

This second device of the prior art is easier and faster to use than the first, in particular if numerous wheels should be so equipped. However, in this second device, the second element ensuring the holding of the anti-rotational means on the wheel is attached by clamping to the rim.

Ultimately, the safety level provided by this second device is also too limited.

Also, the purpose of this invention is to solve the problems of the prior art by proposing a safety device for a wheel of a vehicle, with said device comprising means for locking in rotation attachment elements that are simple and quick to mount on said wheel and that make it possible to ensure integral safety using a locking of the engagement of said device on the wheel.

SUMMARY OF THE INVENTION

For this purpose, the invention has as its object a safety device for a wheel of a vehicle, in particular a road transport vehicle, with said device securing the attachment elements of the rim of said wheel on a hub, said device comprising at least means for locking in rotation said attachment elements and means for holding said locking means on the attachment elements, with said means for locking in rotation consisting of female parts and at least one peripheral wall against which said parts abut in rotation, with at least one part of the attachment elements accommodating at least one female part, the holding means comprising at least one upper wall covering the attachment elements that are equipped with female parts, and said upper wall blocking, directly or by means of another part, the translational movement of said female parts along the attachment elements, with said device being characterized in that it comprises means for engagement with the wheel and in that said engagement is locked mechanically.

BRIEF DESCRIPTION OF THE DRAWINGS

Other characteristics and advantages will emerge from the following description of the invention, a description that is provided only by way of example, relative to the accompanying drawings, in which:

FIGS. 3A to 3D show different variants of the locking means according to the invention.

DETAILED DESCRIPTION OF THE PREFERRED EMBODIMENTS

Figure 1:
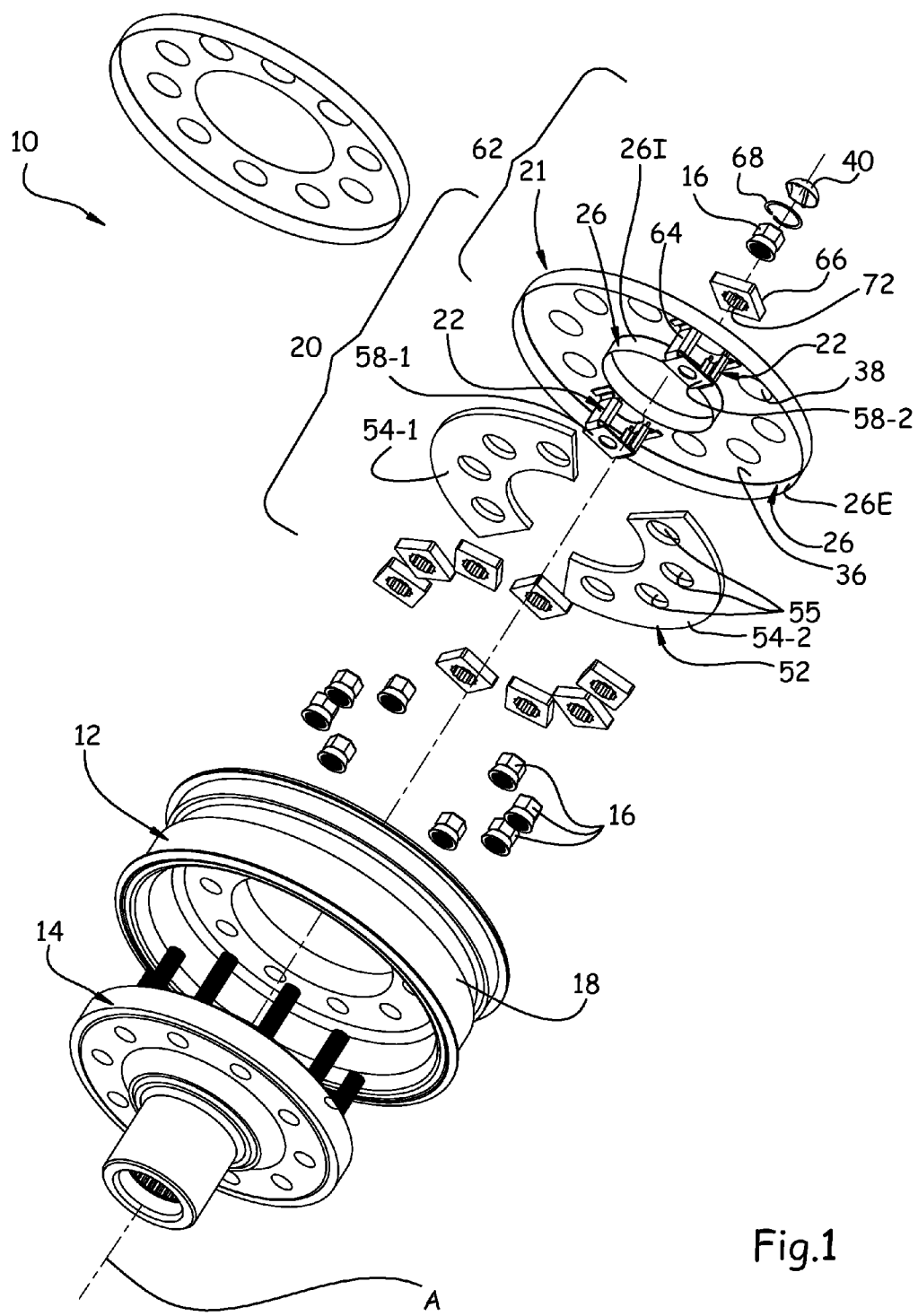
FIG. 1 shows an exploded view of a safety device in a first embodiment according to the invention.
Figure 2:
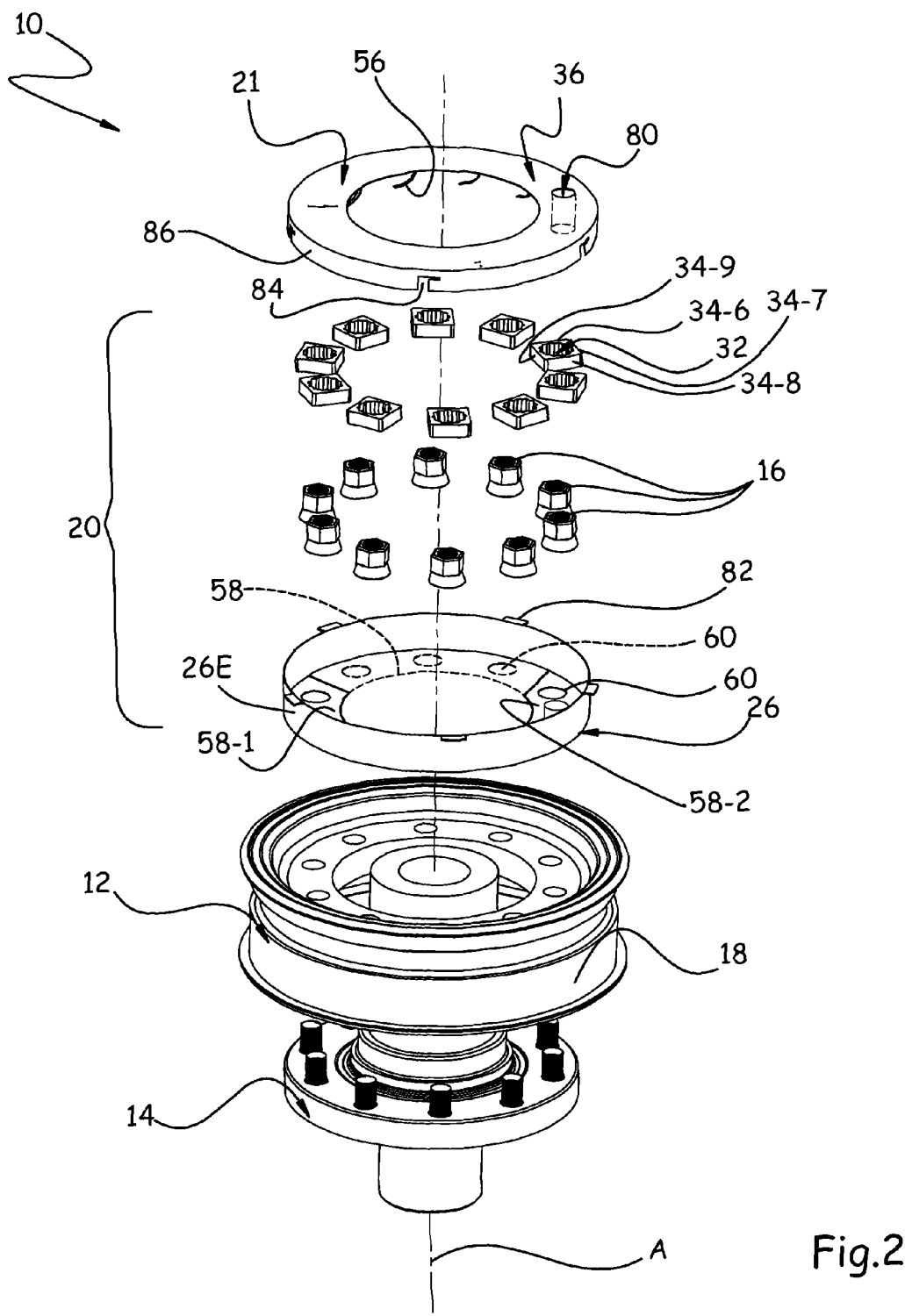
FIG. 2 shows an exploded view of a safety device in a second embodiment according to the invention.

FIGS. 1 and 2 illustrate exploded views in two embodiments of a safety device 10 according to the invention, with said device equipping a wheel 12 mounted on a hub 14.

The purpose of this invention is particularly to secure wheels of road transport vehicles, but this application is in no way limiting, and said safety device can easily be adapted for equipping the wheels of all types of vehicles.

More specifically, said device 10 is to secure the attachment elements 16 of the rim 18 of said wheel 12 on the hub 14, said attachment elements 16 being distributed circularly around the axis A that centrally passes through the assembly between the hub, the wheel, and the safety device.

Regardless of whether the attachment elements 16 are nuts or screws, the safety device according to the invention can secure said elements 16. For this purpose, said device 10 comprises means for locking in rotation 20 said attachment elements 16, means 21 for holding said locking means 20 on the attachment elements 16, and wheel engagement means 22.

According to a significant characteristic of the invention, presented in detail below, said engagement carried out by the means 22 is locked mechanically. Said means 20 for locking in rotation consist of female parts 24 and at least one peripheral wall 26 against which said parts 24 abut in rotation, with at least a portion of the attachment elements 16 accommodating at least one female part 24.

As illustrated in the different variants of the locking means 20 of FIGS. 1, 2 and 3A to 3D, each female part 24 has a non-circular outside profile 28 such that the rotation of said part 24 is stopped at at least one point 30 by at least one peripheral wall 26 that is located close to each of said attachment elements 16.

Still according to the invention, each part 24 comprises at least one housing 32, open or closed, working with at least one portion of the outside surfaces 34, in particular by means of which the tightening torque of at least one attachment element 16 is applied.

As illustrated by FIG. 3A, a part 24 can comprise a curvilinear outside lateral surface 34 along, for example, a curved, oblong profile 28 and a closed hexagonal housing 32 corresponding to six sections of a nut or a screw head forming the attachment element 16.

Next, as illustrated in FIG. 3B, a part 24 can also comprise several outside lateral surfaces (34-1, 34-2) that are curved and/or straight along a profile 28 that comprises curvilinear and/or rectilinear portions, and the housing 32 can be multi-sectional so as to facilitate the positioning of the part 24 around the attachment element 16 and relative to a peripheral surface 26.

Then, as illustrated in FIG. 3C, a part 24 according to the invention can also be polygonal, i.e., comprising at least three straight outside lateral surfaces (34-3, 34-4, 34-5) along a triangular profile 28.

Finally, and as illustrated in FIG. 3D, a part 24 can be polygonal and comprise an open housing 32 working in part with the six sections of a nut or a screw head forming the attachment element 16.

Of course, the four variants that are presented in FIGS. 3A to 3D are not limiting, and the invention also covers a safety device whose locking means comprise female parts imagined from said variants presented above.

As illustrated in FIGS. 1, 2 and 3A to 3D, and regardless of the variant embodiment of a female part 24 according to the invention, said part 24 is stopped at at least one point 30 by at least one inside peripheral wall 26I and/or outside peripheral wall 26E respectively surrounded by and/or surrounding all of the attachment elements 16 that are equipped with female parts 24.

The invention covers, of course, all of the variant embodiments in which the locking means 20 of the device 10 comprise one of the two peripheral walls or the two peripheral walls (26I, 26E).

Preferably, and as illustrated in FIGS. 1 and 2, each female part 24 of the means 20 for locking in rotation is polygonal, with a square outside profile 28, and it comprises four straight outside lateral surfaces (34-6, 34-7, 34-8, 34-9) as well as a closed and multi-sectional housing 32, having in particular 24 sections.

And, still preferably, said inside peripheral wall 26I and outside peripheral wall 26E are approximately cylindrical around the central axis A, and when the device 10 comprises both the inside wall 26I and the outside wall 26E, the latter are concentric on both sides of the circle over which the attachment elements 16 are distributed.

Next, the safety device 10 comprises means 21 for holding said locking means 20 in position on the attachment elements 16.

These holding means 21 comprise at least one upper wall 36 covering the attachment elements 16 that are equipped with female parts 24 in such a way as to prevent the release by translational movement of said female parts 24.

Thus, said upper wall 36 is capable of blocking, directly or by means of another part, the translational movement of said female parts 24 along the attachment elements 16.

Preferably, said upper wall 36 essentially takes the shape of a ring connecting the inside peripheral wall 26I and the outside peripheral wall 26E, and said ring is located in a plane that is perpendicular to the central axis A.

Said upper wall 36 therefore constitutes the most visible surface of the safety device 10, and it can be decorated, painted, etc., in such a way that said device 10 plays the role of a hub cap of the wheel.

Figure 4:
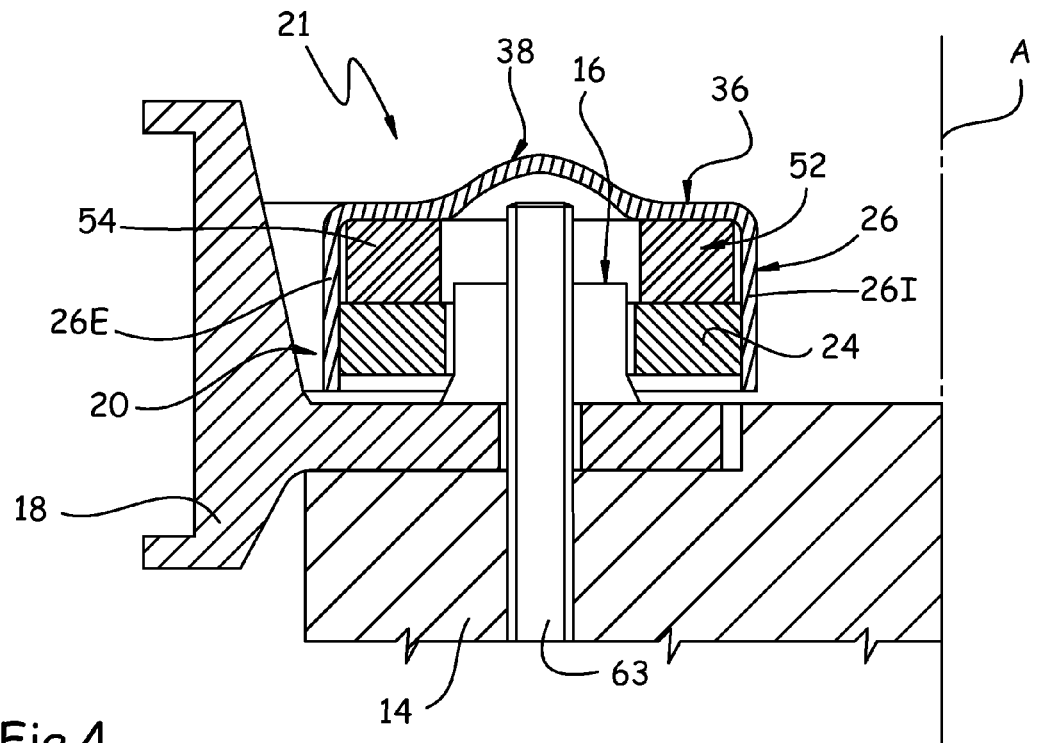
FIG. 4 shows in cutaway view a first variant of the locking means in a first embodiment of a safety device according to the invention.
Figure 5:
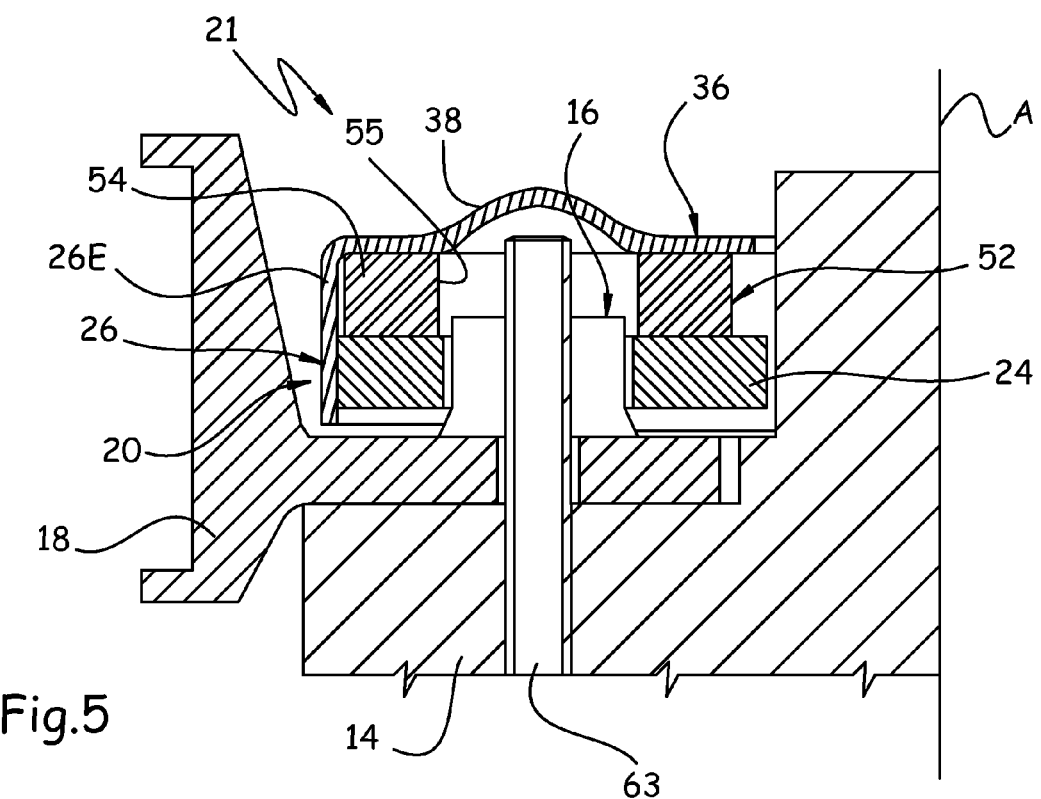
FIG. 5 shows in cutaway view a second variant of the locking means in a first embodiment of a safety device according to the invention.

According to a first variant that is illustrated in perspective in FIG. 1 and in cutaway in FIGS. 4 and 5, said upper wall 36 can comprise projections 38 above each attachment element 16, with said projections being produced with said wall and making it possible to maintain a safety device 10 that is compact and usable with attachment elements above.

Also, while improving the adaptability of the device 10, said projections 38 can impart a more aesthetic aspect to the safety device.

Figure 7:
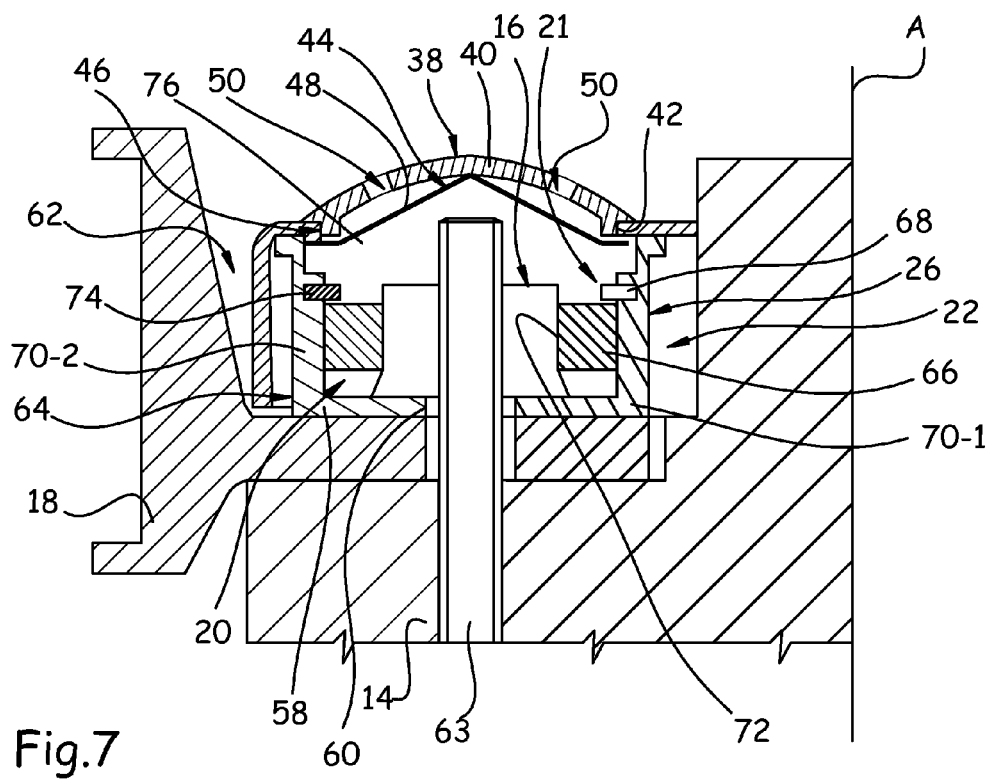
FIG. 7 shows in cutaway view a first variant of the locking means on a wheel of a safety device according to the invention.
Figure 8:
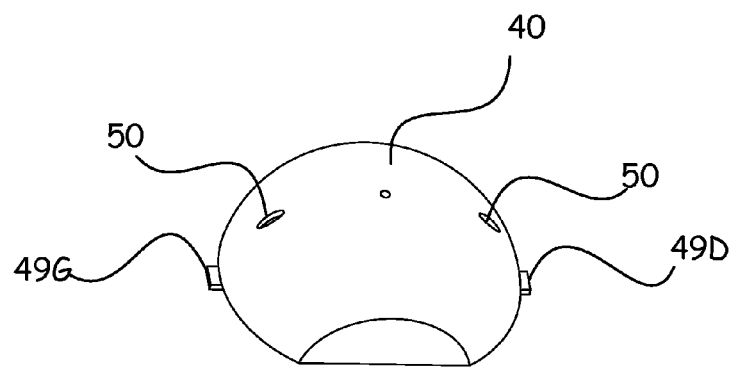
FIG. 8 shows in perspective view a cap of a safety device according to the invention.

According to a second variant that is illustrated in cutaway in FIG. 7 and in perspective in FIG. 8, a projection 38 can also take the shape of a profile cap 40 that is bent and detachable from said upper wall 36.

Said cap 40 is housed in an opening 42 made in said wall 36, and means 44 for positioning and holding said cap at said opening 42.

Said positioning and holding means can comprise a shoulder 46, carried by the cap 40 as illustrated in FIG. 7 or made in the wall 36 to the right of the opening 42, and an elastic blade 48 that is bent and attached under said cap and whose ends (49G, 49D) slide under said wall 36, with small openings 50 being provided in said cap 40 to be able to compress said blade during the mounting of the cap.

Said detachable cap 40 allows an optimization of the safety device 10 consisting in creating at least one cap in a thermosetting material or in painting at least one cap with a paint that is capable of changing color beyond a certain temperature, this in such a way as to quickly detect any abnormal rise in temperature of the hub and its wheel, with said detection being particularly significant in the case of the transport of dangerous or inflammable materials.

Hereinafter, the device 10 according to the invention can comprise damping means 52 combined with holding means 21 and inserted between the upper wall 36 of said means 21 and the female parts 24 that equip the attachment element 16.

Said damping means 52 are capable of being compressed in such a way as to essentially immobilize the female parts 24 in translational movement and to limit the noise, such as pinging, and the effects, such as wear and tear, due to the vibrations of said parts 24 against the attachment elements 16 and the peripheral wall(s) (26I, 26E).

According to a first variant, illustrated in FIGS. 1, 4 and 5, said damping means 52 take the shape of at least one part 54 made of flexible material, and preferably two half-pieces (54-1, 54-2), compressed between the upper wall 36 and each female part 24.

Preferably, the flexible material for creation of each part 54 is a synthetic elastomer that is resistant to hydrocarbons, to salt and with a polychloroprene base, such as Neoprene®.

Advantageously, each part (54, 54-1, 54-2) can comprise openings 55 to the right of each attachment element 16 that is equipped with a female part 24, whereby said openings allow the passage of said elements 16 and make it possible for the part made of flexible material to better rest on the female parts 24.

Figure 6:
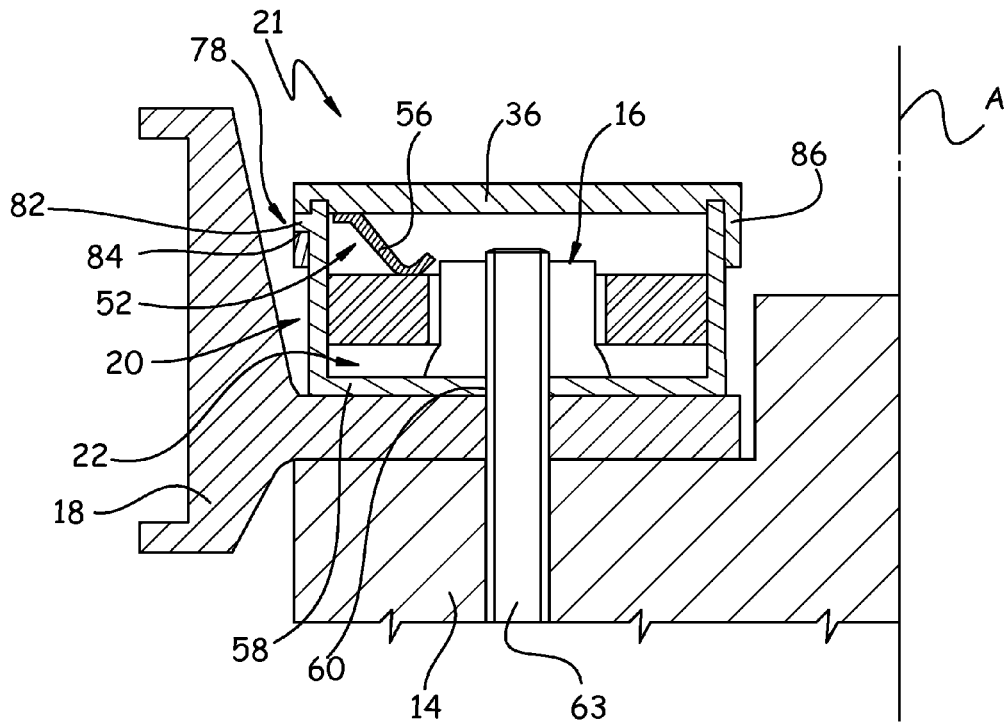
FIG. 6 shows in cutaway view locking means in a second embodiment of a safety device according to the invention.

According to a second variant, illustrated in FIGS. 2 and 6, said damping means 52 comprise at least one leaf spring 56 that is attached under the upper wall 36 and that rests on each female part 24 of the locking means 20.

Preferably, each leaf spring 56 is made of a metal or an elastic metal alloy and is connected by welding under the upper wall 36.

Then, as illustrated by FIGS. 1, 2, 6 and 7, the safety device 10 according to the invention comprises means 22 for engagement with the wheel 12 and the hub 14.

More specifically, in such a way as to form at least one attachment point, said engagement means 22 comprises at least one lower wall 58 that is held against the rim 18 by at least one attachment element 16, with said lower wall 58 being inserted between said element 16 and the rim 18.

For this purpose, said lower wall 58 is equipped with a bore 60 that is adjusted with action close to the diameter of the threaded shaft 63 of said attachment element 16, screw or nut.

Preferably, for a better positioning and a better holding of the device 10, and as illustrated in FIGS. 1 and 2, the engagement means 22 comprise at least two lower walls (58-1, 58-2), each held against the rim 18 by at least one attachment element 16, whereby said lower walls (58-1, 58-2) are diametrically opposite relative to the central axis A.

According to one variant, and in particular as illustrated in dotted lines in FIG. 2, the same lower wall 58 of the device 10 can comprise more than two bores 60 for the creation of several attachment points.

Finally, according to other variants, a single, ring-shaped lower wall 58 like the upper wall 36 can have as many bores 60 as attachment elements 16, and optionally, the diameter of certain bores 60 can be increased in such a way as to prevent the disassembly and the reassembly of certain attachment elements 16 of the wheel 12 during the installation of the device 10 on the wheel 12.

According to an important characteristic of the invention relative to the devices of the prior art, the thus implemented engagement of the safety device 10 with the wheel 12 and with the hub 14 is locked mechanically.

For this purpose, said safety device 10 comprises mechanical locking means 62 ensuring the locking in rotation and in translational movement of each attachment element 16 used for the creation of the engagement means 22 and ensuring the holding of each lower surface (58, 58-1, 58-2) against the rim 18.

Figure 9:
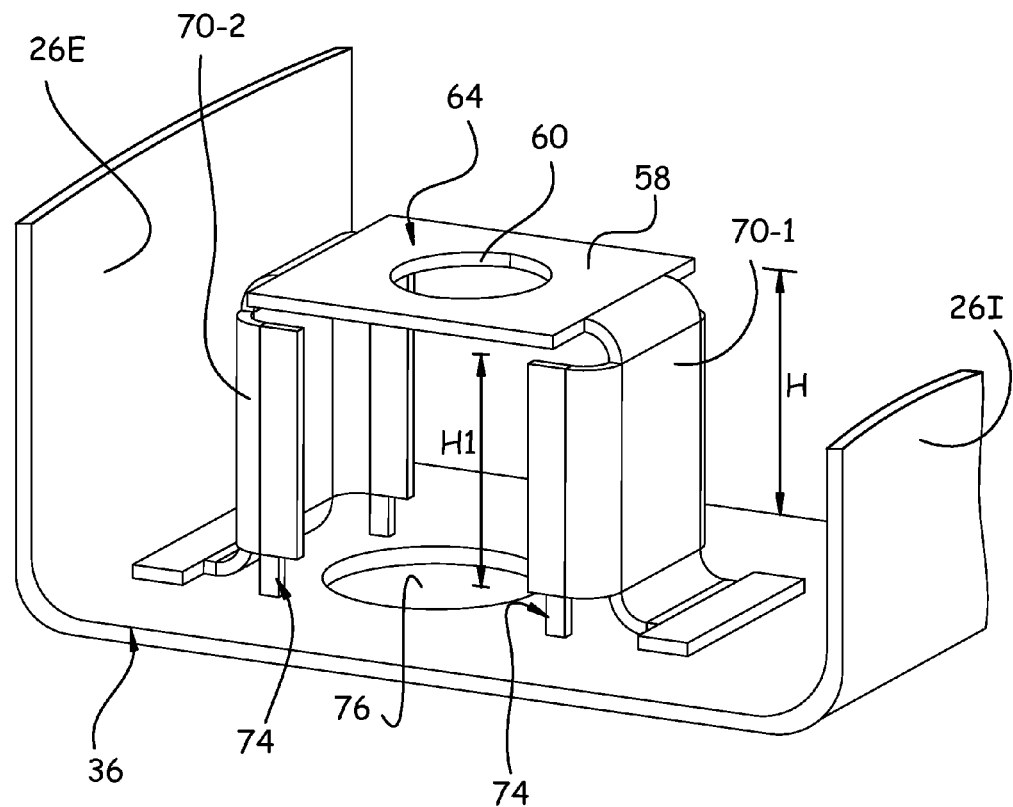
FIG. 9 shows in detail a first variant of the locking means on a wheel of a safety device according to the invention.

Also, in a first embodiment of the safety device 10 according to the invention, illustrated in FIGS. 1, 7 and 9, the upper wall 36 and the peripheral wall(s) (26, 26I, 26E) being part of the same part, and with each lower wall (58, 58-1, 58-2) being connected under said upper wall 36 by means of a support 64 with a suitable height H, said locking means 62 consist of a female part 66 that is housed around each attachment element 16 used for the creation of engagement means 22 and locked in rotation in said support 64, and in an elastic ring 68, of the snap-ring type, mounted in said support 64 and locking said female part 66 in translational movement.

More specifically, each support 64 comprises at least two side walls (70-1, 70-2) supporting said lower wall (58, 58-1, 58-2) on both sides of the latter and made integral, preferably by welding, with the upper wall 36.

Similarly to the locking means 20, each female part 66 has a non-circular outside profile in such a way that the rotation of said part 66 is stopped at at least one point by at least one side wall (70-1, 70-2) that is located close by.

In addition, each part 66 comprises at least one housing 72, open or closed, working with at least one portion of the outside surfaces 34 of the attachment element 16.

Finally, said side walls (70-1, 70-2) comprise an inside groove 74 that makes it possible to accommodate the elastic ring 68 and is located at a height H1 that is suitable for placing said ring just above the female part 66.

Of course, so as to make possible the mounting of the attachment element 16, the female part 66, and the elastic ring 68 successively, said upper wall 36 comprises an opening 76 with dimensions that are suitable for the passage of said elements to be mounted located in the alignment of each support 64, with said opening 76 being able to be sealed by a detachable cap 40 as described above.

Optionally, and in an objective for securing the wheel 12 against theft, each cap 40 that seals an opening 76 of the locking means 62 can be equipped with anti-theft means requiring a key or an analogous means for removing said cap.

Still in this first embodiment of the device 10, and preferably, with the engagement means 22 comprising at least two diametrically opposite lower walls (58-1, 58-2), at least two supports 64 are connected under the upper wall 36, and each support 64 accommodates a female part 66 and an elastic ring 68 that locks the attachment element 16 in rotation and in translational movement ensuring the holding of one of the lower walls (58-1, 58-2).

Preferably, in this first embodiment of the device 10, at least two attachment elements 16 of the wheel are used for the creation of engagement means 22, make it possible to hold the lower walls (58-1, 58-2) against the rim 18, and accommodate the locking means 62, while the other attachment elements 16 accommodate only the locking means 20 described above.

In a second embodiment of the safety device 10 according to the invention, illustrated in FIGS. 2 and 6, the lower wall(s) (58, 58-1, 58-2) and the peripheral wall(s) (26, 26I, 26E) that are part of the same part and the upper wall 36 being connected to the peripheral wall(s) (26, 26I, 26E) by interlocking means 78, said locking means 62 consist of a locking device 80 attaching or detaching said upper wall 36 to or from lower wall(s) (58, 58-1, 58-2) and/or to or from peripheral wall(s) (26, 26I, 26E).

Said locking device 80 is actuated by a key or any other analogous means, thus making it possible simultaneously to ensure an anti-theft function of the wheel 12.

Said interlocking means 78 take, for example, the shape of tabs 82 that are integral with at least one peripheral wall (26, 26I, 26E) and that extend radially relative to the latter, and slots 84 for receiving said tabs, said slots being made in a flange 86 of the upper wall 36.

In this second embodiment, and preferably, all of the attachment elements 16 of the wheel accommodate the locking means 20 described above, at least two attachment elements 16 participate in the creation of engagement means 22 of the device 10 with the wheel 12 and with the hub 14, and all of the attachment elements 16 that are equipped with locking means 20 are locked by means of the upper wall 36 and the device 80.

Figure 10:
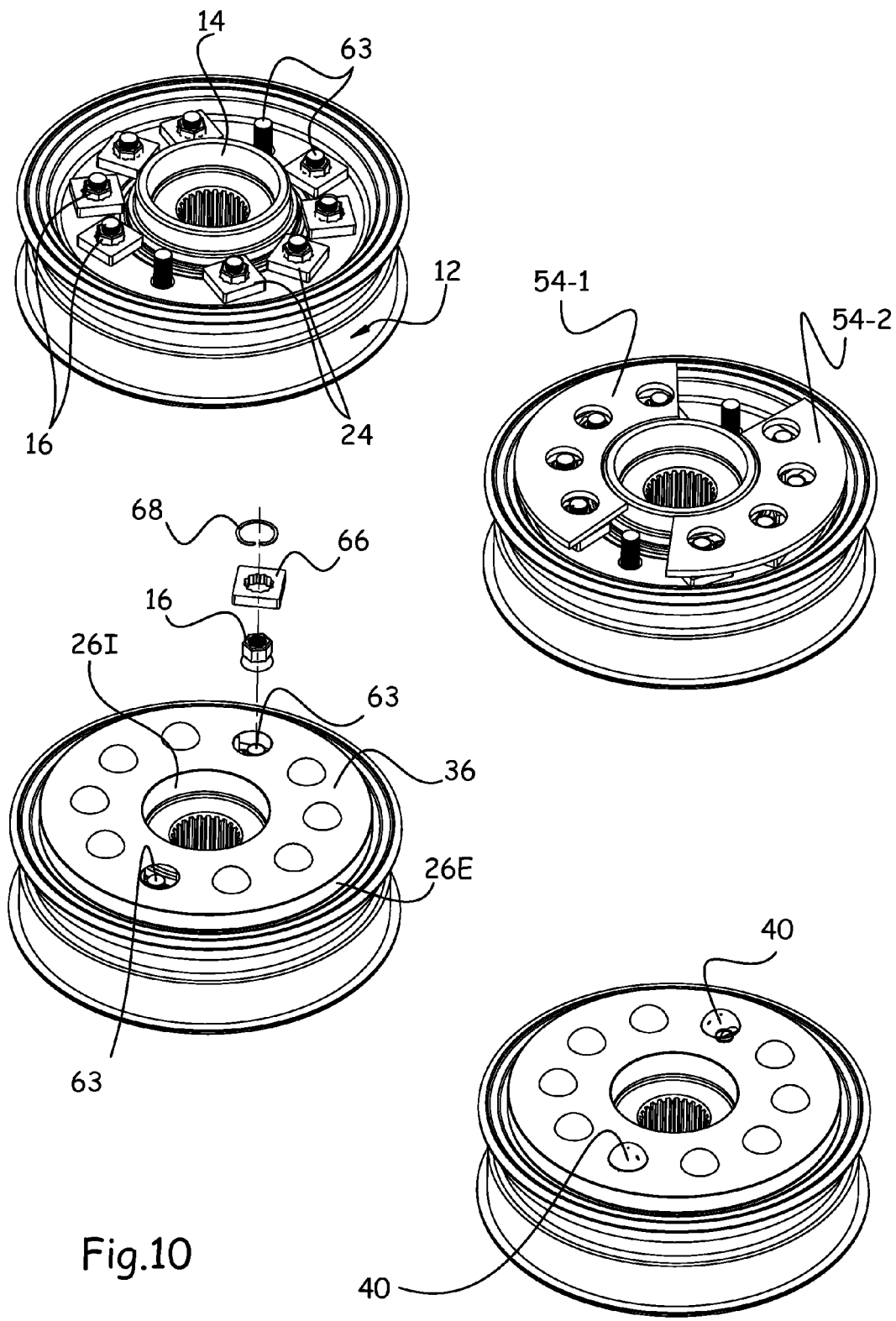
FIG. 10 shows a diagram for mounting a safety device on a wheel according to the invention.

The installation of the safety device 10 in its first embodiment is now presented in detail relative to FIG. 10 showing different stages of said installation in the form of a diagram.

Thus, in a first stage, after installation of the wheel 12 on the hub 14, and in particular by positioning the rim 18 on the threaded shafts 63 of the attachment elements 16, all of the attachment elements 16 except for two diametrically opposite elements are installed on said shafts 63 and tightened with adequate torque.

Next, the female parts 24 of the locking means 20 are arranged on each attachment element 16 that is already in place.

Then, in a second stage, the damping means 52, here taking the shape of two half-pieces (54-1, 54-2) made of flexible material, are installed on the attachment elements 16 that are equipped with female parts 24.

Then, in a third stage, the upper wall 36 that is integral with the inside peripheral wall 26I and the outside peripheral wall 26E is placed above the locking means 20 and the damping means 52, two diametrically opposed supports 64 of the locking means 22, and is connected to the upper wall 36, being positioned on the two threaded shafts 63 that are still free.

Next, once positioned in the supports 64, each free threaded shaft 63 accommodates an attachment element 16 carrying out the engagement of the device 10 in the wheel 12, followed by the female part 66 and the elastic ring 68 of the locking means 62 of said attachment.

Finally, in a fourth and final stage, a cap 40 is to seal each opening 76 made in the upper wall 36 for the requirements of the assembly of the locking means 62. Each cap 40 can, according to requirements, be partially truncated, as shown in FIG. 8.

Also, it is noted that the installation of the safety device 10 according to the invention is particularly simple and quick in comparison to the devices of the prior art, in particular thanks to the design of elements separated from the locking means: the female parts are mounted in full visibility, which makes it possible to easily position them relative to the peripheral wall(s) designed to lock them in rotation.

Finally, in one or the other of the embodiments presented, the locking means ensure holding the safety device on the wheel and therefore maintaining the anti-rotational function implemented by the locking means.

Advantageously, thanks to the reliability of the anti-rotational function, the safety device according to the invention can even make it possible to strictly conform to the tightening torque of the attachment elements 16 at values currently recommended for the road transport vehicles, without needing to exceed them in wanting to be fail-safe, which has the reverse effect as explained in the preamble.

This invention was based on a description relating to road vehicles, but the application to construction vehicles is also very important and is implemented in a strictly identical way, with the same means.

It is understood that this application relates to numerous vehicles, and the danger of a wheel being lost on a construction site can also lead to disasters.

The invention claimed is:

1. A safety device (10), for a wheel (12) of a vehicle, that secures attachment elements (16) of a rim (18) of said wheel (12) on a hub (14), said safety device (10) comprising:
   means (20) for locking in rotation said attachment elements (16);
   means (21) for holding said locking means (20) on the attachment elements (16),
   said means (20) for locking in rotation consisting of female parts (24) and at least one peripheral wall (26, 26I, 26E) against which said female parts (24) abut in rotation, with at least one portion of the attachment elements (16) accommodating at least one female part (24),
   the holding means (21) comprising at least one upper wall (36) covering the attachment elements (16) that are equipped with said female parts (24), said upper wall (36) blocking, directly or by means of another part, the translational movement of said female parts (24) along the attachment elements (16); and
   means (22) for engagement with the wheel (12),
   wherein said engagement is locked mechanically,
   wherein the engagement means (22) comprise at least one lower wall (58, 58-1, 58-2) held against the rim (18) by at least one attachment element (16), with said lower wall (58, 58-1, 58-2) being inserted between said element (16) and the rim (18), and
   wherein a mechanical locking means (62) is provided that locks, in rotation and in translational movement, each attachment element (16) that is used for the creation of engagement means (22) thereby holding each lower surface (58, 58-1, 58-2) against the rim (18).

2. The safety device (10) according to claim 1,
   wherein the upper wall (36) and the peripheral wall(s) (26, 26I, 26E) are part of the same part, each lower wall (58, 58-1, 58-2) being connected under said upper wall (36) by means of a support (64) having a height (H), and
   wherein the locking means consist of a female part (66) that is housed around each attachment element (16) used for the creation of the engagement means (22) and locked in rotation in said support (64), and of an elastic ring (68) that is mounted in said support (64) and locking said female part (66) in translational movement.

3. The safety device (10) according to claim 2, wherein each support (64) comprises at least two side walls (70-1, 70-2) supporting said lower wall (58, 58-1, 58-2) on both sides of the latter and made integral with the upper wall (36), with said side walls (70-1, 70-2) comprising an inside groove (74) located at a height (H1) that is suitable for accommodating the elastic ring (68) just above the female part (66), and wherein said upper wall (36) comprises an opening (76), with dimensions that are suitable for the passage of elements to be mounted, located in the alignment of each support (64), with said opening (76) being able to be sealed by a detachable cap (40).

4. The safety device (10) according to claim 1,
wherein the lower wall(s) (58, 58-1, 58-2) and the peripheral wall(s) (26, 26I, 26E) are part of the same part, the upper wall (36) being connected to the peripheral wall(s) (26, 26I, 26E) by interlocking means (78), and
wherein the locking means consist of a locking device (80) attaching or detaching said upper wall (36) to or from lower wall(s) (58, 58-1, 58-2) and/or to or from peripheral wall(s) (26, 26I, 26E).

5. The safety device (10) according to claim 4, wherein said locking device (80) is actuated by a key or any other analogous means, and wherein said interlocking means (78) take the shape of
tabs (82) that are integral with at least one peripheral wall (26, 26I, 26E) and that extend radially relative to the latter, and slots (84) for receiving said tabs, said slots (84) being made in a flange (86) of the upper wall (36).

6. The safety device (10) according to claim 1, further comprising:
damping means (52) combined with holding means (21) and inserted between the upper wall (36) of said holding means (21) and the female parts (24) equipping the attachment elements (16).

7. The safety device (10) according to claim 6, wherein said damping means (52) comprise at least one part (54, 54-1, 54-2) made of flexible material that is compressed between the upper wall (36) and each female part (24), and wherein each part (54) comprises openings (55) to the right of each attachment element (16) that is equipped with a female part (24).

8. The safety device (10) according to claim 6, wherein said damping means (52) comprise at least one leaf spring (56) that is attached under the upper wall (36) and that rests on each female part (24) of the locking means (20).

9. The safety device (10) according to claim 2, further comprising:
damping means (52) combined with holding means (21) and inserted between the upper wall (36) of said holding means (21) and the female parts (24) equipping the attachment elements (16).

10. The safety device (10) according to claim 3, further comprising:
damping means (52) combined with holding means (21) and inserted between the upper wall (36) of said holding means (21) and the female parts (24) equipping the attachment elements (16).

11. The safety device (10) according to claim 4, further comprising:
damping means (52) combined with holding means (21) and inserted between the upper wall (36) of said holding means (21) and the female parts (24) equipping the attachment elements (16).

12. The safety device (10) according to claim 5, further comprising:
damping means (52) combined with holding means (21) and inserted between the upper wall (36) of said holding means (21) and the female parts (24) equipping the attachment elements (16).

13. The safety device (10) according to claim 1, wherein said vehicle is a road transport vehicle.

* * * * *